(12) United States Patent
Schwarz et al.

(10) Patent No.: US 11,412,267 B2
(45) Date of Patent: Aug. 9, 2022

(54) STORAGE OF MULTIPLE ATLASES FROM ONE V-PCC ELEMENTARY STREAM IN ISOBMFF

(71) Applicant: Nokia Technologies Oy, Espoo (FI)

(72) Inventors: Sebastian Schwarz, Unterhaching (DE); Lukasz Kondrad, Munich (DE); Emre Aksu, Tampere (FI); Lauri Ilola, Tampere (FI); Vinod Kumar Malamal Vadakital, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/140,580

(22) Filed: Jan. 4, 2021

(65) Prior Publication Data

US 2021/0218999 A1 Jul. 15, 2021

Related U.S. Application Data

(60) Provisional application No. 62/959,449, filed on Jan. 10, 2020.

(51) Int. Cl.
*H04N 19/70* (2014.01)
*H04N 19/597* (2014.01)

(52) U.S. Cl.
CPC ........... *H04N 19/70* (2014.11); *H04N 19/597* (2014.11)

(58) Field of Classification Search
None
See application file for complete search history.

(56) References Cited

U.S. PATENT DOCUMENTS

2021/0227232 A1* 7/2021 Oh ............................ G06T 9/00

FOREIGN PATENT DOCUMENTS

EP 3474561 A1 4/2019

OTHER PUBLICATIONS

"Revised Text of ISO/IEC CD 23090-10 Carriage of Video-based Point Cloud Coding Data", Systems, ISO/TEC JTC 1/SC 29/WG 11, N18606, Nov. 8, 2019, 41 pages.
"Information Technology—Coded Representation of Immersive Media—Part 5: Video-based Point Cloud Compression", ISO/IEC 23090-5, 2018, 166 pages.
U.S. Appl. No. 62/853,903, filed May 29, 2019.

* cited by examiner

*Primary Examiner* — Christopher Braniff
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to perform: provide signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

20 Claims, 9 Drawing Sheets

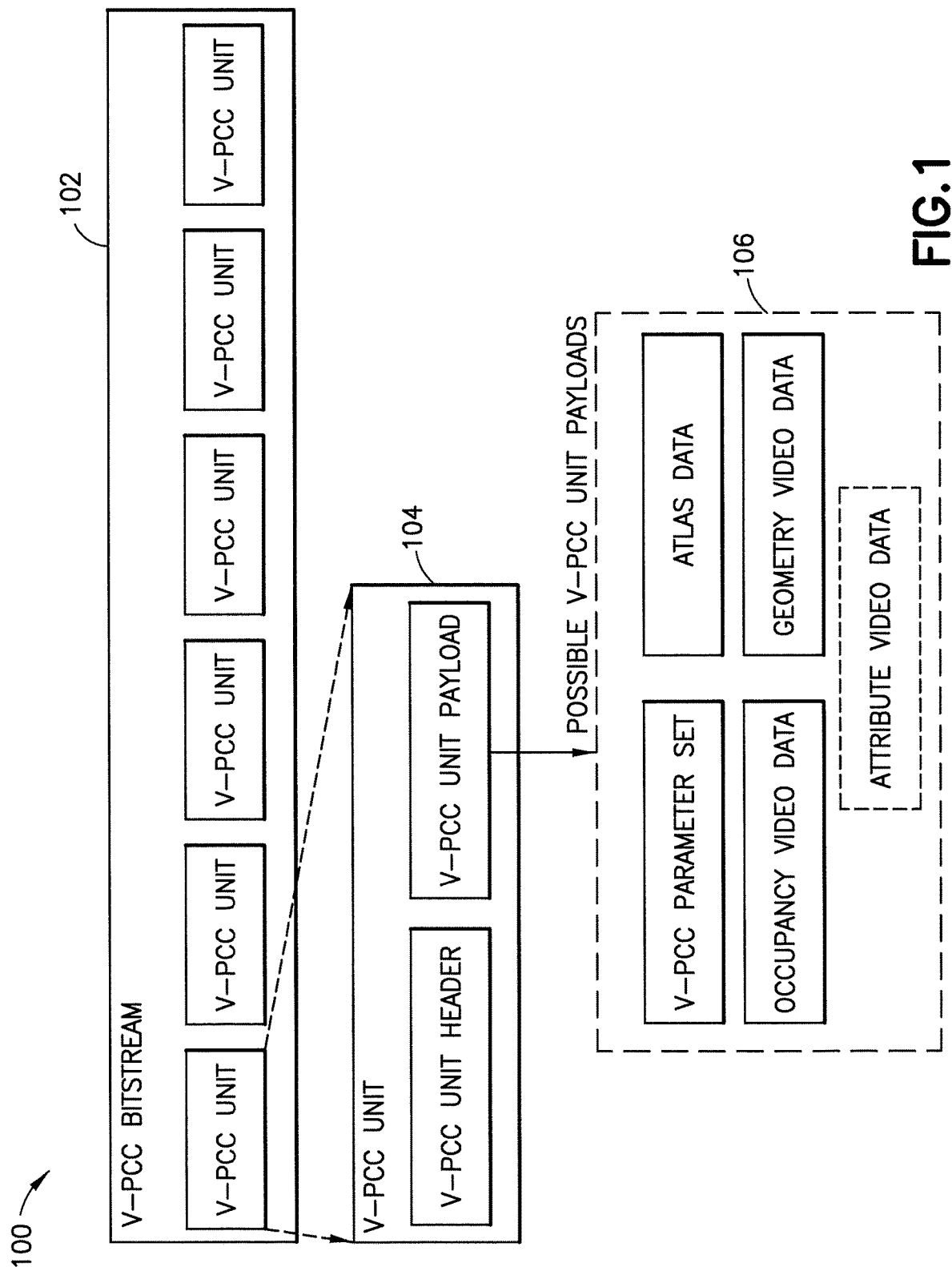

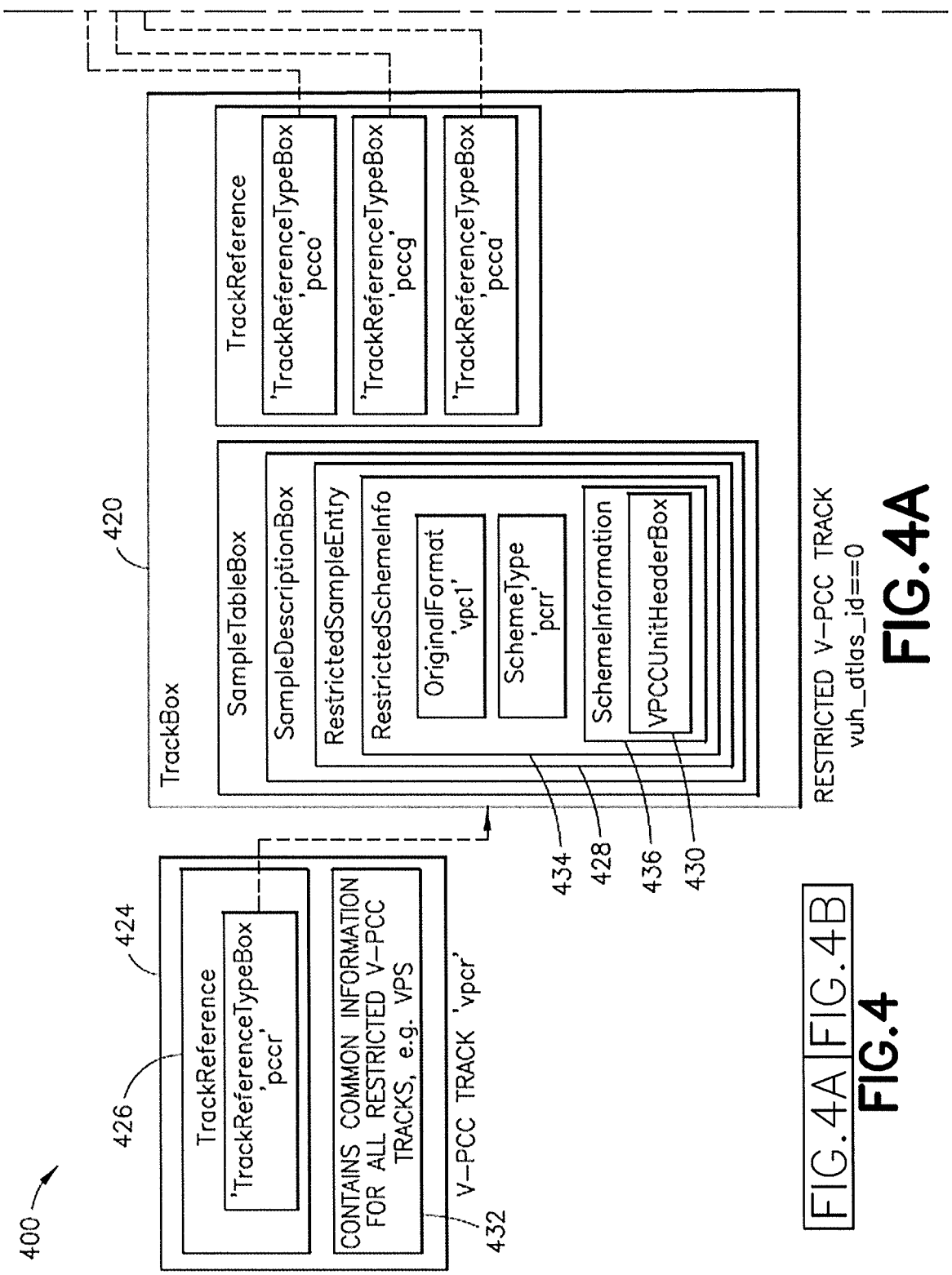

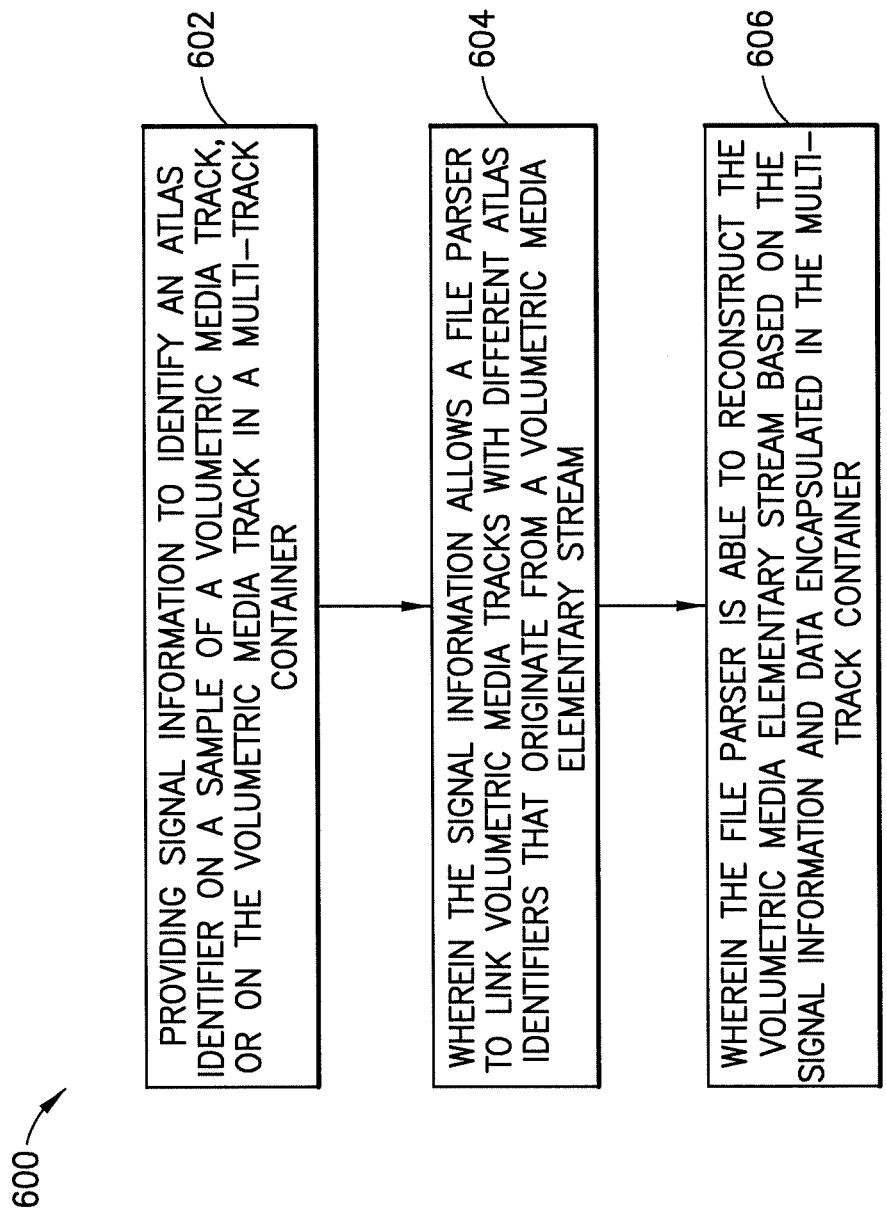

US 11,412,267 B2

STORAGE OF MULTIPLE ATLASES FROM ONE V-PCC ELEMENTARY STREAM IN ISOBMFF

RELATED APPLICATION

This application claims priority to U.S. Provisional Application No. 62/959,449, filed Jan. 10, 2020, which is hereby incorporated by reference in its entirety.

TECHNICAL FIELD

The examples and non-limiting embodiments relate generally to multimedia and software, and more particularly, to storage of multiple atlases from one V-PCC elementary stream in ISOBMFF.

BACKGROUND

It is known to perform video coding and decoding.

SUMMARY

In accordance with an aspect, an apparatus includes at least one processor; and at least one non-transitory memory including computer program code; wherein the at least one memory and the computer program code are configured to, with the at least one processor, cause the apparatus at least to perform: provide signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

In accordance with an aspect, a method includes providing signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

In accordance with an aspect, a non-transitory program storage device readable by a machine, tangibly embodying a program of instructions executable by the machine for performing operations, the operations comprising: providing signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

BRIEF DESCRIPTION OF THE DRAWINGS

The foregoing aspects and other features are explained in the following description, taken in connection with the accompanying drawings, wherein:

FIG. 1 is a block diagram of an example V-PCC elementary stream structure based on the 23090-5 specification.

FIG. 4A and FIG. 4B (collectively FIG. 4) depict an example multi-track container structure with a restricted V-PCC track.

FIG. 6 is an example method to implement storage of multiple atlases from one V-PCC elementary stream in ISOBMFF.

DETAILED DESCRIPTION OF EXAMPLE EMBODIMENTS

Figures 2, 2A:
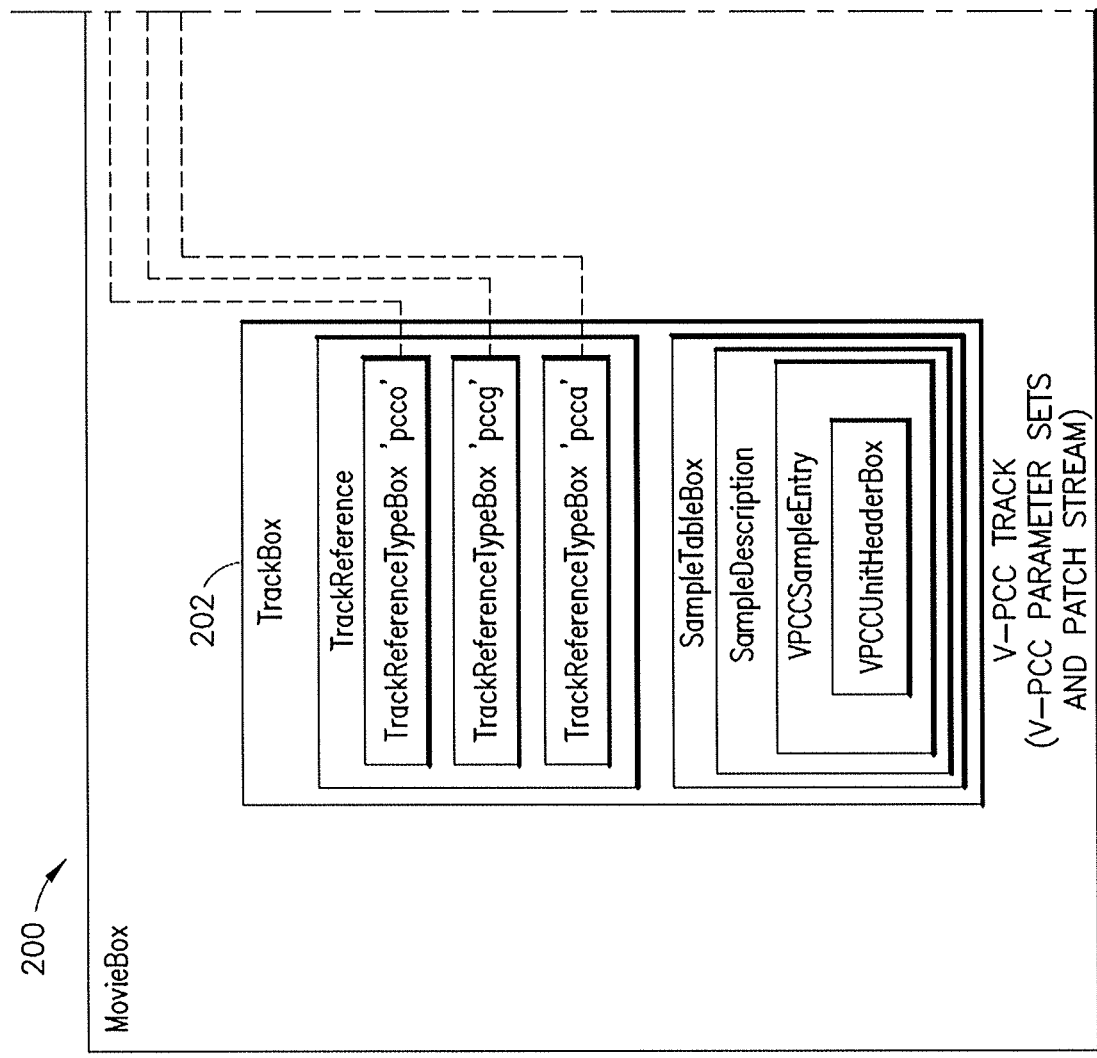
FIG. 2A and FIG. 2B (collectively FIG. 2) depict an example ISOBMFF multi-track container structure according to ISO/IEC 23090-10.
Figure 2B:
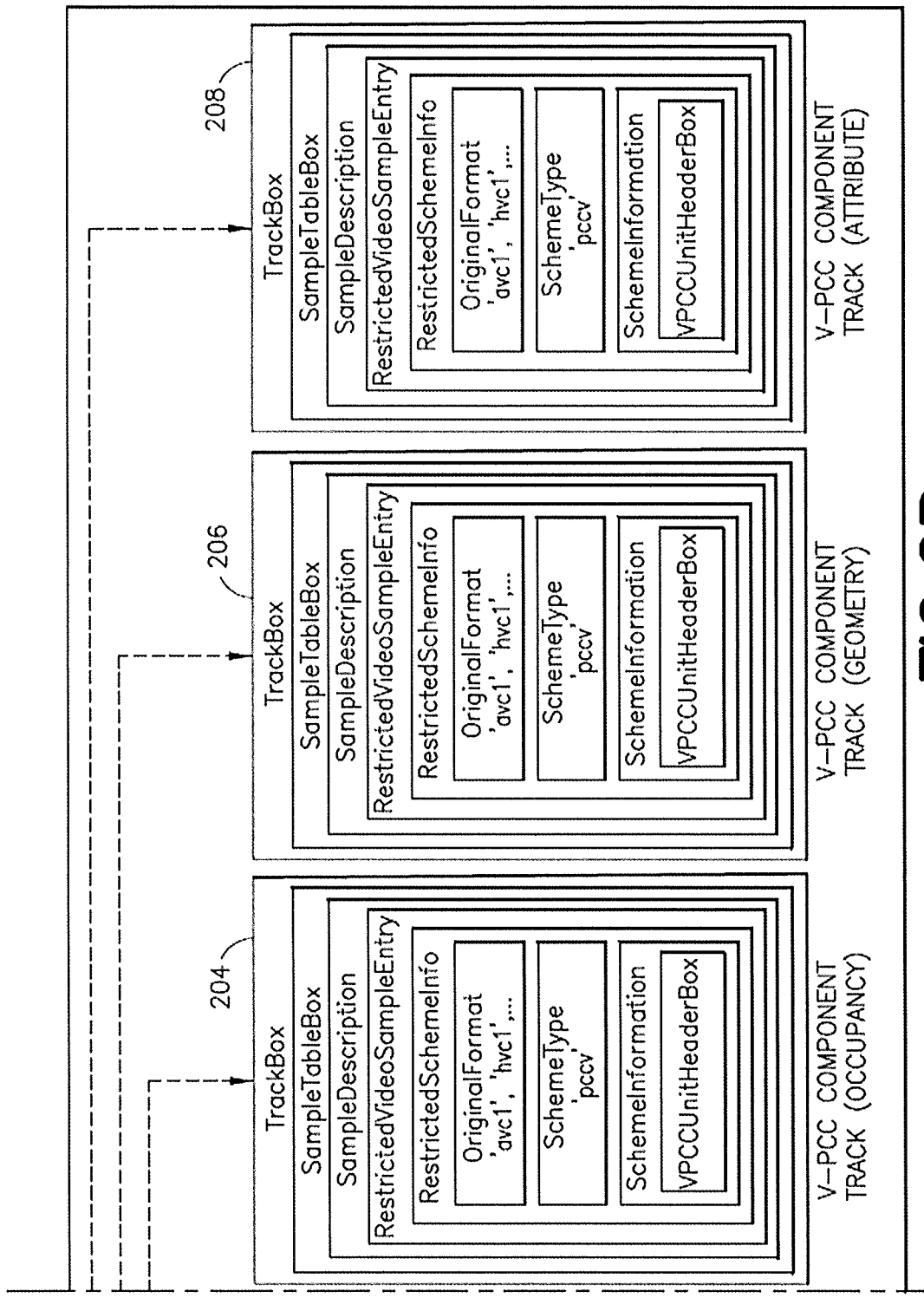

The following acronyms and abbreviations that may be found in the specification and/or the drawing figures are defined as follows:

2D or 2d two-dimensional
3D or 3d three-dimensional
3DoF+ 3 degrees of freedom and greater
3GPP 3rd Generation Partnership Project
4CC four-character code
CD Committee Draft
HEVC High Efficiency Video Coding
H.26x family of video coding standards in the domain of the ITU-T
id or ID identifier
IEC International Electrotechnical Commission
I/F interface
I/O input/output
ISO International Organization for Standardization
ISOBMFF ISO Base Media File Format
MIV MPEG immersive video
MPEG moving picture experts group
MPEG-I MPEG immersive
MP4 file format for MPEG-4 Part 14 files
NAL network abstraction layer
NW network
V3C visual volumetric video-based coding
V-PCC or V PCC Video-based Point Cloud Compression Box-structured file formats. Box-structured and hierarchical file format concepts have been widely used for media storage and sharing. The most well-known file formats in this regard are the ISO Base Media File Format (ISOBMFF) and its variants such as MP4 and 3GPP file formats.

ISOBMFF allows storage of timely captured audio/visual media streams, called media tracks. The metadata which describes the track is separated from the encoded bitstream itself. The format provides mechanisms to access media data in a codec-agnostic fashion from the file parser perspective.

A basic building block in ISOBMFF is called a box. Each box has a header and a payload. The box header indicates the type of the box and the size of the box in terms of bytes. Box type is typically identified by an unsigned 32-bit integer, interpreted as a four-character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, ISOBMFF may be considered to specify a hierarchical structure of boxes.

In files conforming to the ISO base media file format, the media data may be provided in one or more instances of MediaDataBox (mdat) and the MovieBox (moov) may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type.

Tracks comprise samples, such as audio or video frames, volumetric information, or metadata. For video tracks, a media sample may correspond to a coded picture or an access unit. For volumetric media track, samples may correspond to coded atlas access unit. A media/volumetric media track refers to samples (which may also be referred to as media/volumetric media samples) formatted according to a media/volumetric media compression format (and its encapsulation to the ISO base media file format). A timed metadata track may refer to samples describing referred media samples.

SampleDescriptionBox ('stsd') is contained by SampleTableBox and provides detailed information about the coding type used, and any initialization information needed for that coding. The information stored in the SampleDescriptionBox after the entry-count is track-type specific and can also have variants within a track type (e.g. different codings may use different specific information after some common fields, even within a video track). Which type of sample entry form is used is determined by the media handler, using a suitable form defined in ISO 14496-12, in a derived specification, or from registration.

```
aligned(8) abstract class SampleEntry (unsigned int(32)
format)
    extends Box(format){
        const unsigned int(8)[6] reserved = 0;
        unsigned int(16) data_reference_index;
}
aligned(8) class SampleDescriptionBox (unsigned int(32)
handler_type)
    extends FullBox('stsd', version, 0){
        int i ;
        unsigned int(32) entry_count;
        for (i = 1 ; i <= entry_count ; i++){
            SampleEntry( );   // an instance of a class
derived from SampleEntry
        }
}
```

SampleEntry boxes may contain "extra boxes" not explicitly defined in the box syntax of ISO/IEC 14496-12. When present, such boxes shall follow all defined fields and should follow any defined contained boxes. Decoders shall presume a sample entry box could contain extra boxes and shall continue parsing as though they are present until the containing box length is exhausted.

Exactly one TrackReferenceBox ('tref') can be contained within the TrackBox. If this box is not present, the track is not referencing any other track in any way. The reference array is sized to fill the reference type box. TrackReferenceBox provides a reference from the containing track to another track in the presentation. These references are typed using TrackReferenceTypeBoxes where there shall be at most one TrackReferenceTypeBox of a given type in a TrackReferenceBox.

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
    unsigned int(32) track_IDs[ ];
}
```

For example, a TrackReferenceTypeBox of reference_type 'hint' reference links from the containing hint track to the media data that it hints, i.e. tracks indicated by the track_IDs array within TrackReferenceTypeBox.

SubSampleInformationBox ('subs') is a box designed to contain sub-sample specific information, where a sub-sample is a contiguous range of bytes of a sample. The specific definition of a sub-sample is supplied for a given coding system (e.g. for ISO/IEC 14496-10, Advanced Video Coding).

```
aligned(8) class SubSampleInformationBox
    extends FullBox('subs', version, flags) {
        unsigned int(32) entry_count;
        int i,j;
        for (i=0; i < entry_count; i++) {
            unsigned int(32) sample_delta;
            unsigned int(16) subsample_count;
            if (subsample_count >0) {
                for (j=0; j < subsample_count; j++) {
                    if(version == 1)
                    {
                        unsigned int(32) subsample_size;
                    }
                    else
                    {
                        unsigned int(16) subsample_size;
                    }
                    unsigned int(8) subsample_priority;
                    unsigned int(8) discardable;
                    unsigned int(32)
codec_specific_parameters;
                }
            }
        }
}
```

TrackGroupBox ('trgr') is contained by a TrackBox. TrackGroupBox enables indication of groups of tracks, where each group shares a particular characteristic or the tracks within a group have a particular relationship. TrackGroupBox contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. Track groups are not used to indicate dependency relationships between tracks. Instead, the TrackReferenceBox is used for such purposes.

The syntax of TrackGroupBox is the following:

```
aligned(8) class TrackGroupBox('trgr') {
}
aligned(8) class TrackGroupTypeBox(unsigned int(32)
track_group_type) extends FullBox(track_group_type, version
= 0, flags = 0)
{
```

```
    unsigned int(32) track_group_id;
    // the remaining data may be specified for a particular
track_group_type
}
```

Items. Files conforming to the ISOBMFF may contain any non-timed objects, referred to as items, meta items, or metadata items, in a MetaBox ('meta'). While the name of the MetaBox refers to metadata, items can generally contain metadata or media data. The MetaBox may reside at the top level of the file, within a MovieBox ('moov'), and within a TrackBox ('trak'), but at most one MetaBox may occur at each of the file level, movie level, or track level.

An entity group is a grouping of items, which may also group tracks. The entities in an entity group share a particular characteristic or have a particular relationship, as indicated by the grouping type.

Entity groups are indicated in GroupsListBox ('grpl'). Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. When GroupsListBox is present in a file-level MetaBox, there is no item ID value in ItemInfoBox ('iinf') in any file-level MetaBox that is equal to the track_ID value in any TrackHeaderBox.

GroupsListBox contains EntityToGroupBoxes, each specifying one entity group. The four-character box type of EntityToGroupBox denotes a defined grouping type.

In order to handle situations where the file author requires certain actions on the player or renderer ISO/IEC 14496-12 specifies a mechanism that enables players to simply inspect a file to find out such requirements for rendering a bitstream and stops legacy players from decoding and rendering files that require further processing. In other words the content (tracks) should only be decoded by players that present it correctly.

A Restricted Sample Entry is defined as a sample entry on which the following transformation procedure has been applied:
  The four character code of the sample entry is replaced by a new sample entry code 'resv' meaning restricted video.
  A RestrictedSchemeInfoBox is added to the sample description, leaving all other boxes unmodified.
  The original sample entry type is stored within an OriginalFormatBox contained in the RestrictedSchemeInfoBox.

The original sample entry type is contained in the OriginalFormatBox ('frma') located in the RestrictedSchemeInfoBox ('rinf'). The exact nature of the restriction is defined in the SchemeTypeBox ('schm'), and the data needed for that scheme is stored in the SchemeInformationBox ('schi').

Volumetric Video Coding. In the field of volumetric video compression and 3 degrees-of-freedom and greater (3DoF+) video, a character or a scene captured with a set of depth cameras or synthetically modelled and animated as a 3D scene, can be encoded as a volumetric video. Volumetric video compression typically segments the 3D content into a set of 2D tiles or tiles containing color, geometry, and optionally occupancy data, which can then be compressed using a standard 2D video compression format. Thus, color, geometry and occupancy data can be considered as components of volumetric video. Volumetric video compression is currently explored and standardized in the MPEG-I standardization efforts.

A volumetric video compression in 23090-12 can use 3D scene segmentation to generate views that can be packed into atlases and efficiently encoded using existing 2D compression technologies such as H.265 or H.264. For the end-user to consume such content, a standard metadata format may need to be defined that efficiently describes information required for view synthesis. A volumetric video compression in 23090-5 specification defines similar metadata structures but limits the number of atlases to one.

V-PCC elementary stream. 23090-5 specification besides defining the volumetric video compression defines also an elementary stream that can be used not only to carry data compressed by the standard itself but as well as by other standards. An example here is the possibility of using V-PCC elementary stream to carry data compressed using 23090-12 specification. The naming of some of the data structures described herein may change during the standardization process. For example, as reflected in ISO/IEC 23090-5, ISO/IEC 23090-10 and ISO/IEC 23090-12, V-PCC elementary stream is now called V3C (Visual Volumetric Video-based Coding) elementary stream. Accordingly, as described and claimed herein, uses of V-PCC elementary stream or V PCC elementary stream may be used interchangeably (e.g. substituted with) with V3C elementary stream.

FIG. 1 is a block diagram 100 of an example V-PCC elementary stream structure based on the 23090-5 specification. As shown in FIG. 1, the V PCC elementary stream 102 is composed of a set of V-PCC units. Each V-PCC unit 104 has a V-PCC unit header and a V PCC unit payload. The V-PCC unit header describes the V-PCC unit type 106. The supported V-PCC unit types 106 are VPCC_VPS, VPCC_OVD, VPCC_AVD, VPCC_GVD, and VPCC_AD, corresponding respectively to V-PCC Parameter Set, Occupancy Video Data, Attribute Video Data, Geometry Video Data, and Atlas Data.

VPCC_VPS unit type carry V-PCC Parameter Set. V-PCC Parameter Set contains information that allows to understand and properly consume the content of V-PCC elementary stream. V-PCC Parameter Set is shared among all atlases in V-PCC elementary stream.

VPCC_OVD, VPCC_AVD, VPCC_GVD unit types carry occupancy, attribute and geometry Video Data. This data corresponds to video data units that could be decoded by an appropriate video decoder (e.g., an HEVC NAL unit).

VPCC_AD unit type carries Atlas Data. This data corresponds to atlas NAL units that contain metadata information. This metadata together with V-PCC Parameter Set and Video Data is used to reconstruct the encoded volumetric structure (e.g. point cloud when the metadata is according to 23090-5 or 3DoF+ video when the metadata is according to 23090-12).

When a number of atlases are present in a V-PCC elementary stream, each atlas can be uniquely identified and parsed using vuh_atlas_id defined in the VPCC unit header.

| | Descriptor |
|---|---|
| vpcc_unit_header( ) {<br>  vuh_unit_type<br>  if( vuh_unit_type  = =  VPCC_AVD \|\| vuh_unit_type  = =  VPCC_GVD \|\|<br>    vuh_unit_type  = =  VPCC_OVD \|\| vuh_uni t_type  = =  VPCC_AD ) { | u(5) |

-continued

| | Descriptor |
|---|---|
| vuh_vpcc_parameter_set_id | u(4) |
| vuh_atlas_id | u(6) |
| } | |
| if( vuh_unit_type  = =  VPCC_AVD ) { | |
| vuh_attribute_index | u(7) |
| vuh_attribute_dimension_index | u(5) |
| vuh_map_index | u(4) |
| vuh_raw_video_flag | u(1) |
| } else if( vuh_unit_type  = =  VPCC_GVD ) | |
| { | |
| vuh_map_index | u(4) |
| vuh_raw_video_flag | u(1) |
| vuh_reserved_zero_12bits | u(12) |
| } else | |
| if( vuh_unit_type  = =  VPCC_OVD  \|\|  vuh_unit_type  = =  VPCC_AD ) | |
| vuh_reserved_zero_17bits | u(17) |
| Else | |
| vuh_reserved_zero_27bits | u(27) |
| } | |

Design of ISOBMFF for V-PCC. According to current CD text of 23090-10, multi-track container structure is encapsulating one V-PCC elementary stream in ISOBMFF as one V-PCC Track (a form of volumetric media track) and number of V-PCC Component Tracks (a form of video media tracks), see FIG. 2. In particular, FIG. 2 is an example ISOBMFF multi-track container structure 200 according to ISO/IEC 23090-10. V-PCC Track 202 contains V-PCC Parameter Set and NAL units carrying Atlas Data information. V-PCC Component Tracks contain video encoded information (occupancy 204, geometry 206, attribute 208).

While encapsulating V-PCC elementary stream in ISOBMFF, each V-PCC unit header is stored in VPCCUnitHeaderBox ('vunt'). In V-PCC Track 202, VPCCUnitHeaderBox is stored in VPCCSampleEntry. In V-PCC Component Track (such as items 204, 206, and 208), VPCCUnitHeaderBox is in SchemeInformation in RestrictedVideoSampleEntry. VPCCUnitHeaderBox allows identification of what component the V-PCC Component Track carries. In both cases, it is assumed that the data in the VPCCUnitHeaderBox won't change throughout the whole duration of a track.

Multiple Atlases in V-PCC elementary stream. After MPEG 128 meeting V-PCC elementary bitstream may contain more than one atlas (as of ISO/IEC 23090-5, ISO/IEC 23090-10 and ISO/IEC 23090-12, V-PCC elementary bitstream is now called V3C (Visual Volumetric Video-based Coding) elementary stream). This functionality was added to carry data encoded according to MIV specification (23090-12). In order to enable this functionality, vuh_atlas_id was added to V-PCC unit header for V-PCC units with types: VPCC_AD, VPCC_GVD, VPCC_OVD, and VPCC_AVD.

Addition of vuh_atlas_id creates implications in the design of multi-track container structure when it comes to V-PCC Track. For example (though the problems solved by the examples described herein are not limited to the below description):

V-PCC sample allows only one V-PCC unit payload to be stored. Consequently, a V-PCC Track per atlas would have to be created.

There is no functionality that links a number of V-PCC Tracks to the same V-PCC elementary stream.

There is no information on how VPCC_VPS need to be stored (e.g. would it be duplicated per each V-PCC Track)

There is no functionality to signal the main V-PCC Track when more than one V-PCC Track are present.

There is no functionality to enable sharing common data between V-PCC tracks.

V-PCC Component Tracks can be created without modification, as from their perspective vuh_atlas_id is yet another identifier of a track similar to vuh_unit_type, vuh_attribute_index, vuh_map_index, and vuh_attribute_dimension_index.

Partial Access in V-PCC ISOBMFF. CD text of 23090-10 also introduces a high level solution for partial access to 3-dimensional space, where tracks are grouped based on what the spatial region data in those tracks belong. The specification does not mention, however, whether those tracks are from one V-PCC elementary stream or from independent V-PCC elementary streams. In case of one V-PCC elementary stream: the tool would allow only to split video tracks (occupancy, geometry, attribute) based on to what the spatial region data in those tracks belong. The atlas data in V-PCC track remains in its original form. Consequently, all atlas data needs to be downloaded/decoded even if only one spatial region is displayed to the end user. Splitting the atlas data to number of atlases that corresponds to some spatial regions would help partial access scenario. However, as mentioned above, the storage of multiple atlases in a multi-track container structure is not fully supported.

Thus, in summary, the problem the examples described herein address include:

No functionality to store multiple atlases (i.e. V-PCC units of type VPCC_AD with different vuh_atlas_id) in one V-PCC track No functionality that links number of V-PCC tracks to the same V-PCC elementary stream.

The functionality would be required for partial access to Point Cloud

Or as alternative way to store multiple atlases, i.e. not in one V-PCC Track.

No design how VPCC_VPS would be stored if multiple atlases are present (e.g. would it be duplicated per each V-PCC Track?) if multiple V-PCC Tracks are created.

No consideration on how camera_params_list of MIV (23090-12), which is common for multiple atlases, is stored in ISOBMFF U.S. provisional application No. 62/853,903, filed by the assignee of the examples described herein (Nokia), describes a single-track encapsulation mode using a similar (though different) method as in one of the embodiments described herein (see storage of multiple atlases in one V-PCC Track—embodiment 4).

The examples described herein provide signalling information to identify atlas id on a sample or V-PCC Track in multi-track container. Additionally, the signalling ensures that a file parser is able to link V-PCC Tracks with different atlas ids that originate from a single V-PCC elementary stream. Consequently, a file parser is able to reconstruct the original V-PCC elementary stream based on the signalling information and data encapsulated in the multi-track container.

Storage of Multiple Atlases in One V-PCC Track.

1. In One Embodiment a VPCCUnitHeaderBox is not stored in VPCCSampleEntry as currently defined in CD text of 23090-10.

a new definition of VPCCSample for V-PCC Track is specified where

"Each sample in the V-PCC track corresponds to a single frame. Samples corresponding to this frame in the various component tracks shall have the same composition time as the V-PCC track sample. Each V-PCC sample shall contain one or more V-PCC unit payload of type VPCC_AD that have the same composition time, as defined in ISO/IEC 23090-5 [VPCC], which may include one or more atlas NAL units."

- a vuh_atlas_id is mapped to atlas_id within VPCCSample structure for each nalUnit

```
aligned(8) class VPCCSample {
    unsigned int Length = sample_size; // size of sample
(e.g., from SampleSizeBox)
    for (i=0; I < Length; ) {
        unsigned int (8) atlas_id;
        sample_stream_nal_unit_nalUnit; // as defined in
ISO/IEC 23090-5
        i +=
(VPCCDecoderConfigurationRecord.lengthSizeMinusOne+1) +
nalUnit.ssnu_nal_unit_size;
    }
}
```

2. In a Second Embodiment a VPCCUnitHeaderBox is not stored in VPCCSampleEntry as currently defined in CD text of 23090-10.

a new definition of VPCCSample for V-PCC Track is specified where

"Each sample in the V-PCC track corresponds to a single frame. Samples corresponding to this frame in the various component tracks shall have the same composition time as the V-PCC track sample. Each V-PCC sample shall contain one or more V-PCC unit payload of type VPCC_AD that have the same composition time, as defined in ISO/IEC 23090-5 [VPCC], which may include one or more atlas NAL units."

- a vuh_atlas_id is mapped to atlas_id within VPCCSample structure for a group of nalUnits

```
aligned(8) class VPCCSample {
    unsigned int Length = sample_size; // size of sample
(e.g., from SampleSizeBox)
    unsigned int Atlases = atlas_count // number of atlases
(e.g. vps_atlas_count_minus1 + 1 in VPS in
VPCCDecoderConfigurationRecord
    for (a = 0; a < Atlases; a++){
        unsigned int (8) atlas_id;
        for (i=0; I < Length; ) {
            sample_stream_nal_unit_nalUnit; // as defined in
ISO/IEC 23090-5
            i +=
(VPCCDecoderConfigurationRecord.lengthsizeMinusOne+1) +
nalUnit.ssnu_nal_unit_size;
        }
    }
}
```

3. In Another Embodiment a VPCCUnitHeaderBox is not stored in VPCCSampleEntry as currently defined in CD text of 23090-10.

a new definition of VPCCSample for V-PCC Track is specified where

"Each sample in the V-PCC track corresponds to a single frame. Samples corresponding to this frame in the various component tracks shall have the same composition time as the V-PCC track sample. Each V-PCC sample shall contain one or more V-PCC unit payload of type VPCC_AD that have the same composition time, as defined in ISO/IEC 23090-5 [VPCC], which may include one or more atlas NAL units."

- vuh_atlas_id is implicitly mapped to nalUnits within VPCCSample

```
aligned(8) class VPCCSample {
    unsigned int Length = sample_size; // size of sample
(e.g., from SampleSizeBox)
    unsigned int Atlases = atlas_count // number of atlases
(e.g. vps_atlas_count_minus1 + 1 in VPS in
VPCCDecoderConfigurationRecord
    for (a = 0; a < Atlases; a++){
        for (i=0; I < Length; ) {
            sample_stream_nal_unit nalUnit; // as defined in
ISO/IEC 23090-5
            i +=
(VPCCDecoderConfigurationRecord.lengthSizeMinusOne+1) +
nalUnit.ssnu_nal_unit_size;
        }
    }
}
```

4. In Another Embodiment a VPCCUnitHeaderBox is not stored in VPCCSampleEntry as currently defined in CD text of 23090-10.

a new definition of VPCCSample for V-PCC Track is specified where

"Each sample in the V-PCC track corresponds to a single frame. Samples corresponding to this frame in the various component tracks shall have the same composition time as the V-PCC track sample. Each V-PCC sample shall contain one or more V-PCC unit payload of type VPCC_AD that have the same composition time, as defined in ISO/IEC 23090-5 [VPCC], which may include one or more atlas NAL units."

- a VPCCSample is structured according to 23090-10 or embodiment three but without assumption of implicit mapping.
- a SubSampleInformationBox is part of V-PCC Track and it contains VPCCUnitHeaderBox in codec_specific_parameters field. VPCCUnitHeaderBox links the sub-sample nalUnits in VPCCSample to vuh_atlas_id.

5. In Another Embodiment a VPCCUnitHeaderBox is not stored in VPCCSampleEntry as currently defined in CD text of 23090-10.

a new definition of VPCCSample for V-PCC Track is specified where samples no longer contain atlas_sub_bitstream and instead contain sequence of vpcc_units with both payload and header.

"Each sample in the V-PCC track corresponds to a single frame. Samples corresponding to this frame in the various component tracks shall have the same composition time as the V-PCC Track sample. Each V-PCC sample shall contain one or more V-PCC units of type VPCC_AD that have the same composition time, as defined in ISO/IEC 23090-5 [VPCC], which may include one or more atlas NAL units."

```
aligned(8) class VPCCSample {
    unsigned int(8) vpcc_unit_count; // number of vpcc-units in
sample
    for (i=0; i<vpcc_unit_count; i++) {
```

```
        unsigned int(16) vpcc_unit_length;
        vpcc_unit(vpcc_unit_lentgh) vpcc_unit; // as
defined in ISO/IEC 23090-5
    }
}
```

Specifying new grouping types. Utilizing new grouping types (entity grouping, track grouping) allows for faster access to the information as parsing track groups comes earlier in the parsing hierarchy than parsing tracks itself.

6. In Another Embodiment grouping structure should contain information about the atlas id and an explicit indicator to signal, whether the track in question should be considered as the main track a new grouping type (e.g. 'vpes') is specified for the track group mechanism as follows.

Definition
Box Type: 'vpes'
Container: TrackGroupBox
Mandatory: No
Quantity: Zero or More
Syntax

```
aligned(8) class VPCCElementaryStreamGroupBox
    extends TrackGroupTypeBox('vpes') {
    // track_group_id is inherited from TrackGroupTypeBox
syntax
    unsigned int(1) main_track;
    unsigned int(8) atlas_id;
    bit(23) reserved = 0;
}
```

Semantics track_group_id is an integer that specifies a group or collection of tracks. If the VPCCElementaryStreamGroupBox is absent there is no information on whether the track is linked with other V-PCC tracks. track_group_id shall be the same for tracks that originated from the same V-PCC elementary stream.

main_track equal to 1 indicates that this V-PCC track contains the common data for all other V-PCC Tracks belonging to the same group (e.g. contains VPCC Parameter Set in VPCCDecoderConfigurationRecord), and main_track equal to 0 indicates this V-PCC track does not contain common data.

atlas_id is an integer that identifies the atlas to which data carried in this V-PCC track belongs to.

7. In Another Embodiment grouping structure should contain atlas id. Track with a specific atlas-id may be implicitly considered as the main track, e.g. atlas_id=0.

a new grouping type (e.g. 'vpes') is specified for the track group mechanism as follows.

Definition
Box Type: 'vpes'
Container: TrackGroupBox
Mandatory: No
Quantity: Zero or More
Syntax

```
aligned(8) class VPCCElementaryStreamGroupBox
    extends TrackGroupTypeBox('vpes') {
    // track_group_id is inherited from TrackGroupTypeBox
syntax
    unsigned int(8) atlas_id;
}
```

Semantics track_group_id is an integer that specifies a group or collection of tracks. If the VPCCElementaryStreamGroupBox is absent there is no information on whether the track is linked with other V-PCC tracks. track_group_id shall be the same for tracks that originated from the same V-PCC elementary stream.

atlas_id is an integer that identifies the atlas to which data carried in this V-PCC track belongs to.

8. In Another Embodiment grouping structure should contain vpcc-unit header, which contains information about the atlas id as well as an explicit indicator for main track.

a new grouping type (e.g. 'vspes') is specified for the track group mechanism as follows.

Definition
Box Type: 'vpes'
Container: TrackGroupBox
Mandatory: No
Quantity: Zero or More
Syntax

```
aligned(8) class VPCCElementaryStreamGroupBox
    extends TrackGroupTypeBox('vpes') {
    // track_group_id is inherited from TrackGroupTypeBox
syntax
    unsigned int(1) main_track;
    bit(31) reserved = 0;
    VPCCUnitHeaderBox( )
}
```

Semantics track_group_id is an integer that specifies a group or collection of tracks. If the VPCCElementaryStreamGroupBox is absent there is no information on whether the track is linked with other V-PCC tracks. track_group_id shall be the same for tracks that originated from the same V-PCC elementary stream.

main_track equal to 1 indicates that this V-PCC track contains the common data for all other V-PCC Tracks belonging to the same group (e.g. contains VPCC Parameter Set in VPCCDecoderConfigurationRecord), and main_track equal to 0 indicates this V-PCC track does not contain common data. VPCCUnitHeaderBox( ) as defined in 23090-10

9. In Another Embodiment track group should contain only vpcc-unit header for track in question.

a new grouping type (e.g. 'vpes') is specified for the track group mechanism as follows.

Definition
Box Type: 'vpes'
Container: TrackGroupBox
Mandatory: No
Quantity: Zero or More
Syntax

```
aligned(8) class VPCCElementaryStreamGroupBox
    extends TrackGroupTypeBox('vpes') {
    // track_group_id is inherited from TrackGroupTypeBox
    syntax
        VPCCUnitHeaderBox( )
}
```

Semantics track_group_id is an integer that specifies a group or collection of tracks. If the VPCCElementaryStreamGroupBox is absent there is no information on whether the track is linked with other V-PCC tracks. track_group_id shall be the same for tracks that originated from the same V-PCC elementary stream.
VPCCUnitHeaderBox( ) as defined in 23090-10

10. In Another Embodiment two new grouping type (e.g. 'vypes' and 'atls') are specified for the track group mechanism as follows.
Definition
Box Type: 'vypes'
Container: TrackGroupBox
Mandatory: No
Quantity: Zero or More
Syntax

```
aligned(8) class VPCCElementaryStreamGroupBox
    extends TrackGroupTypeBox('vpes') {
    // track_group_id is inherited from TrackGroupTypeBox
    syntax
}
```

Semantics track_group_id is an integer that specifies a group or collection of tracks. If the VPCCElementaryStreamGroupBox is absent there is no information on whether the track is linked with other tracks. track_group_id shall be the same for tracks that originated from the same V-PCC elementary stream.
Definition
Box Type: 'atls'
Container: TrackGroupBox
Mandatory: No
Quantity: Zero or More
Syntax
aligned(8) class AtlasGroupBox

```
    extends TrackGroupTypeBox('atls') {
    // track_group_id is inherited from TrackGroupTypeBox
    syntax
        unsigned int(8) atlas_id;
}
```

Semantics track_group_id is an integer that specifies a group or collection of tracks. If the AtlasGroupBox is absent there is no information to which atlas the track belongs to. track_group_id shall be the same for tracks that belong to the same atlas.
atlas_id is an integer that identifies the atlas to which data carried in this track belongs to.

Figures 3, 3A:
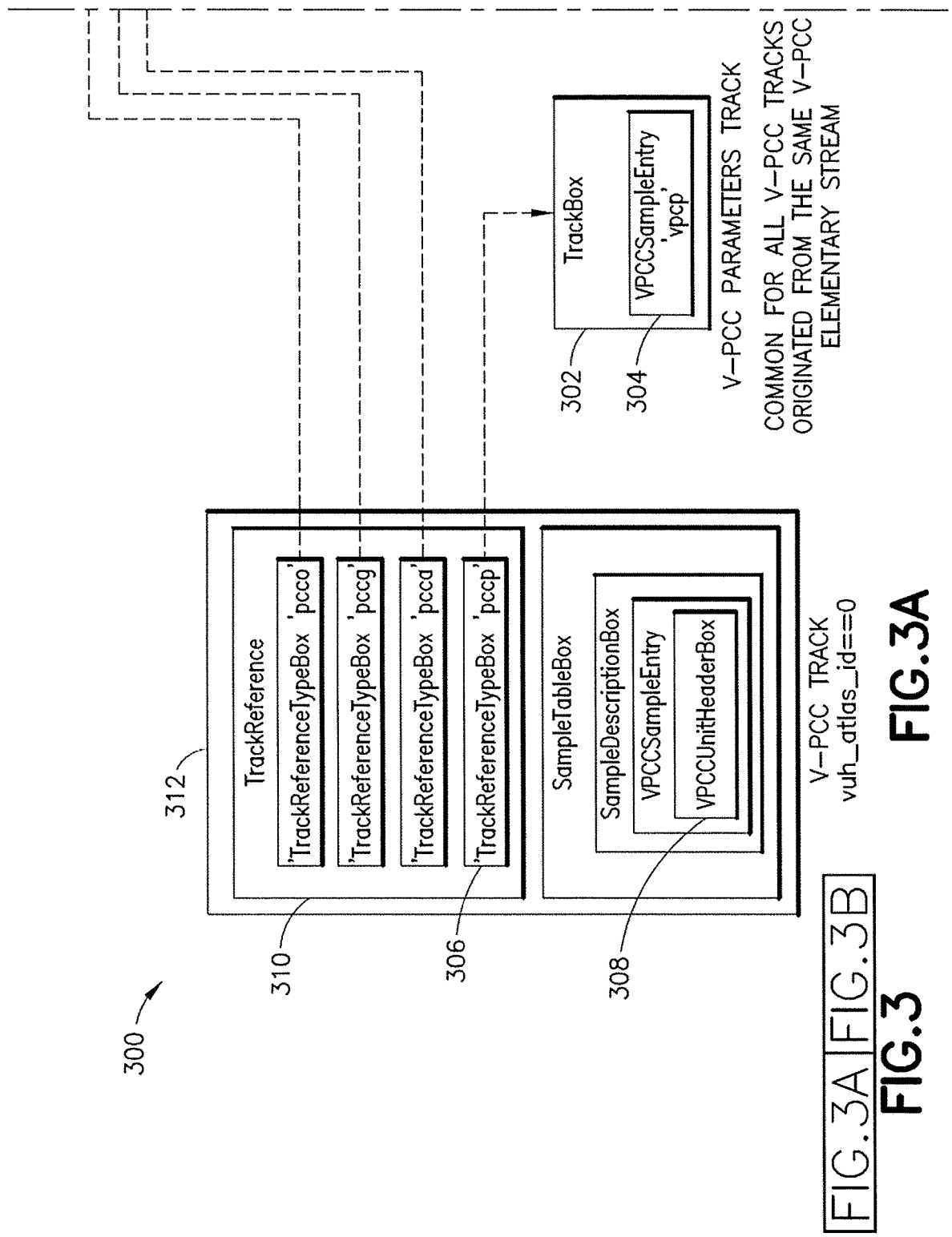
FIG. 3A and FIG. 3B (collectively FIG. 3) depict an example multi-track container structure with a V-PCC parameter track.
Figure 3B:
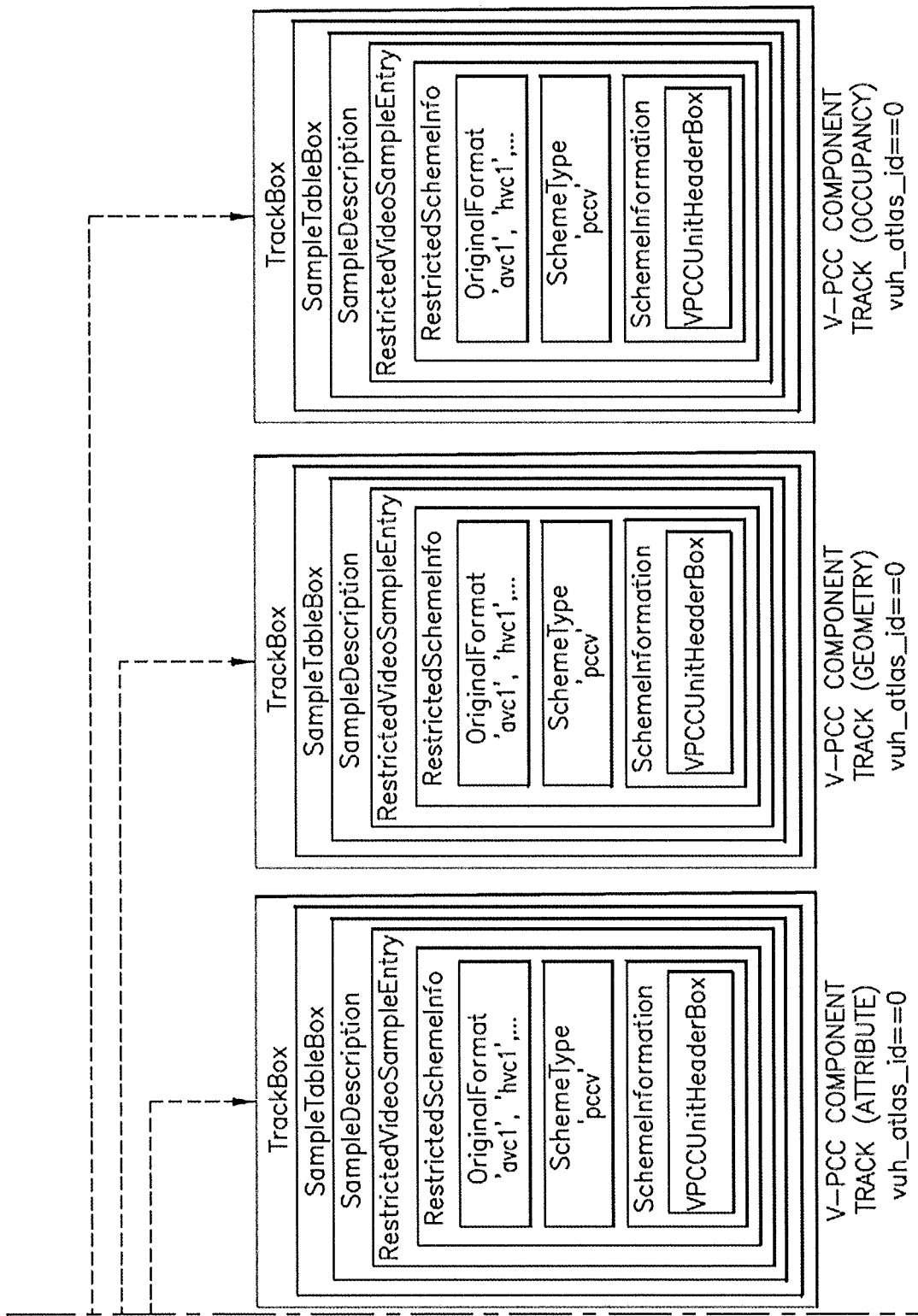

Specifying new V-PCC parameter track. FIG. 3 depicts an example of a multi-track container structure 300 with V-PCC parameter track 302.

11. In Another Embodiment a new V-PCC sample entry 'vpcp' 304 of V-PCC Track (V-PCC Parameters Track 302) and a new track reference of type 'pccp' 306 are specified.

a VPCCUnitHeaderBox 308 is not stored in VPCCSampleEntry of type 'vpcp'

V-PCC Track (V-PCC Parameters Track 302) with VPCCSampleEntry of type 'vpcp' 304 contains common data of all VPCC Tracks originated from the same V-PCC elementary stream (e.g. VPCC unity of type VPCC_VPS that is stored in VPCCDecoderConfigurationRecord or MIV Camera Parameters that are common for all atlases)

A track reference of type 'pccp' 306 in the V-PCC track reference table 310, referencing V-PCC Parameters Track 302, is used to connect from the V-PCC Track 312 to the V-PCC Parameters Track 302 (FIG. 3).

Figure 4B:
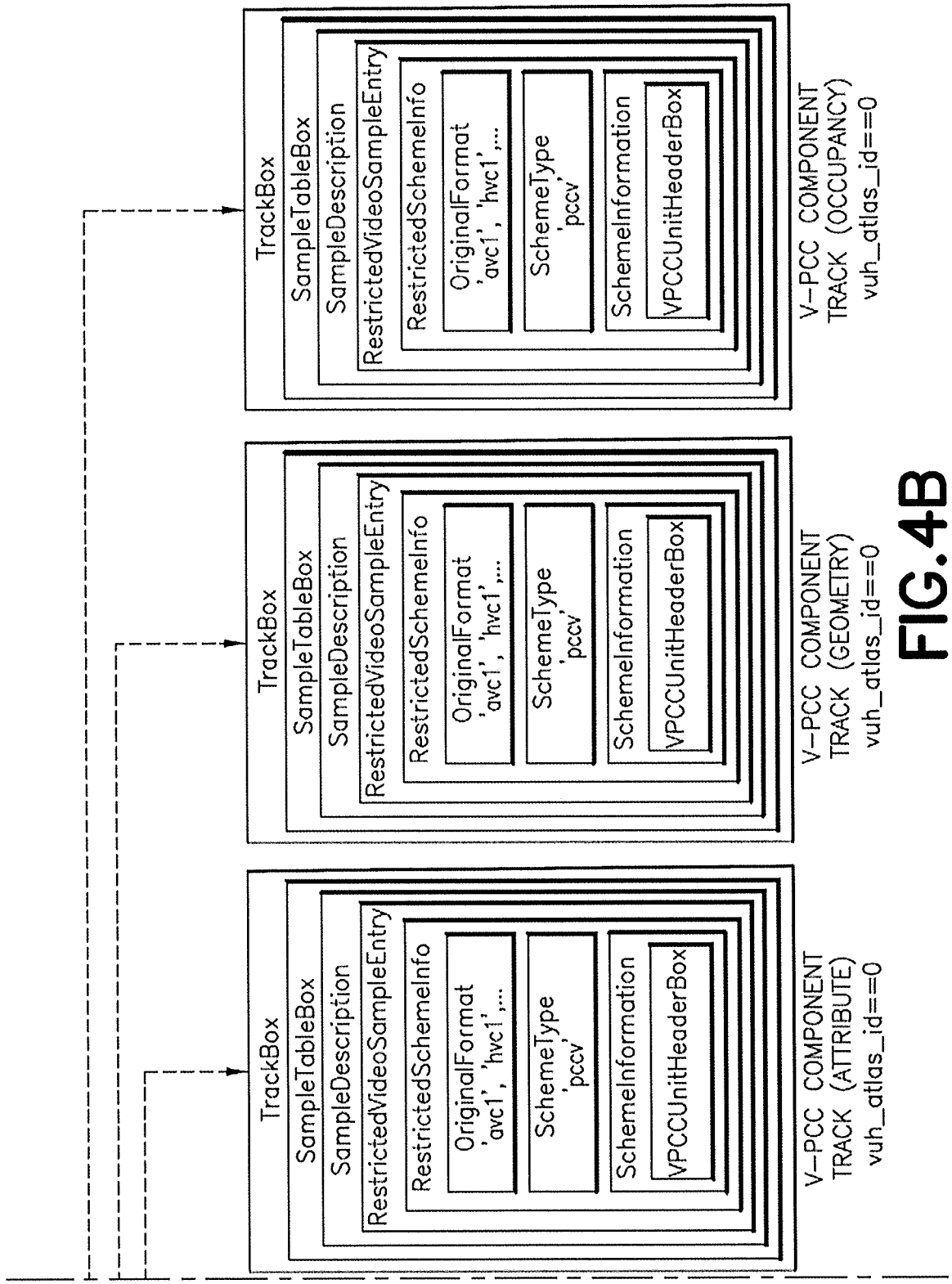

Specifying new restricted V-PCC tracks. FIG. 4 is an example of a multi-track container structure 400 with a restricted V-PCC track 420.

12. In Another Embodiment a new V-PCC sample entry 'vper' of V-PCC Track 424, a new track reference of type 'pccr' 426, and new restrictedVPCCSampleEntry 'perr' 428 are specified.

a VPCCUnitHeaderBox 430 is not stored in VPCCSampleEntry of type 'vper'

V-PCC Track 424 with VPCCSampleEntry of type 'vper' contains only common data 432 of all RestrictedVPCCTracks (e.g. VPCC unity of type VPCC_VPS that is stored in VPCCDecoderConfigurationRecord or MIV Camera Parameters that are common for all atlases)

a restrictedVPCCSampleEntry 'pcrr' 428 contains RestrictedSchemeInfo 434 that contains SchemeInformationBox 436 that finally contains VPCCUnitHeaderBox 430.

A track reference of type 'pcrr' 426 in the V-PCC track with VPCCSampleEntry of type 'vpcr' 424 is used to connect from the V-PCC Track 424 to all RestrictedVPCCTracks 420 (FIG. 4).

Figure 5:
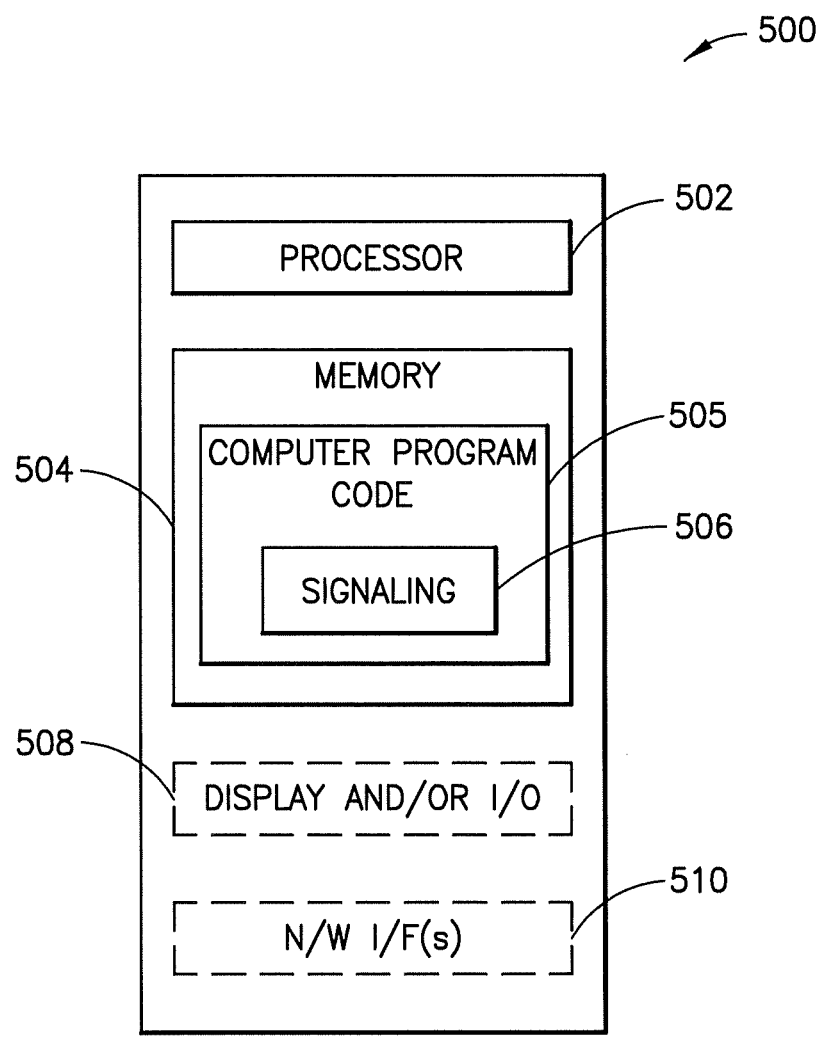
FIG. 5 is an example apparatus configured to implement storage of multiple atlases from one V-PCC elementary stream in ISOBMFF.

FIG. 5 is an example apparatus 500, which may be implemented in hardware, configured to implement storage of multiple atlases from one V-PCC elementary stream in ISOBMFF, based on the examples described herein. The apparatus 500 comprises a processor 502, at least one non-transitory memory 504 including computer program code 505, wherein the at least one memory 504 and the computer program code 505 are configured to, with the at least one processor 502, cause the apparatus to implement atlas signaling, circuitry, a coder, a decoder, a process, component, module, or function (collectively signaling 506) to implement storage of multiple atlases from one V-PCC elementary stream in ISOBMFF, based on the examples described herein. The apparatus 500 optionally includes a display and/or I/O interface 508 that may be used to display an output as a result of signaling 506 or content during rendering. The apparatus 500 optionally includes one or more network (NW) interfaces (I/F(s)) 510. The NW I/F(s) 510 may be wired and/or wireless and communicate over the Internet/other network(s) via any communication technique. The NW I/F(s) 510 may comprise one or more transmitters and one or more receivers. The N/W I/F(s) 510 may comprise standard well-known components such as an amplifier, filter, frequency-converter, (de)modulator, and encoder/decoder circuitry(ies) and one or more antennas.

The apparatus 500 may be a remote, virtual or cloud apparatus. The apparatus 500 may be either a coder or a decoder, or both a coder and a decoder. The memory 504 may be implemented using any suitable data storage technology, such as semiconductor based memory devices, flash memory, magnetic memory devices and systems, optical memory devices and systems, fixed memory and removable memory. The memory 504 may comprise a database for storing data.

FIG. 6 is an example method 600 to implement storage of multiple atlases from one V-PCC elementary stream in ISOBMFF, based on the examples described herein. At 602, the method includes providing signal information to identify an atlas identifier on a sample of a volumetric media track, or on the volumetric media track in a multi-track container. At 604, the method includes wherein the signal information allows a file parser to link volumetric media tracks with different atlas identifiers that originate from a volumetric media elementary stream. At 606, the method includes wherein the file parser is able to reconstruct the volumetric media elementary stream based on the signal information and data encapsulated in the multi-track container.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to perform: provide signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

The apparatus may further include wherein the signal information comprises: a volumetric media sample entry of volumetric media parameters track comprising common data of volumetric media tracks originating from the volumetric media elementary stream; and a track reference in a volumetric media parameters track reference table that references a volumetric media track, and is used to connect from the volumetric media parameters track to the volumetric media track.

The apparatus may further include wherein a volumetric media unit header atlas identifier is mapped to an atlas identifier within a volumetric media sample structure for each of one or more network abstraction layer units.

The apparatus may further include wherein a volumetric media unit header atlas identifier is mapped to an atlas identifier within a volumetric media sample structure for a group of network abstraction layer units.

The apparatus may further include wherein a volumetric media unit header atlas identifier is implicitly mapped to network abstraction layer units within a volumetric media sample structure.

The apparatus may further include wherein the volumetric media track comprises a sub sample information box, and wherein the sub sample information box comprises a volumetric media unit header box in a codec specific parameters field that links sub sample network abstraction layer units in a volumetric media sample to a volumetric media unit header atlas identifier.

The apparatus may further include wherein the sample of the volumetric media track comprises a sequence of volumetric media units having a payload and header, and the sample corresponds to a single point cloud frame, wherein samples corresponding to the single point cloud frame within one or more component tracks have a composition time corresponding to a composition time of the sample of the volumetric media track.

The apparatus may further include wherein the signal information comprises a grouping structure, the grouping structure comprising information about the atlas identifier; and an indicator to signal whether the volumetric media track is a main track having common data for other volumetric media tracks belonging to a group.

The apparatus may further include wherein the signal information comprises a grouping structure, the grouping structure comprising the atlas identifier, wherein a track with a specific atlas identifier is implicitly considered as a main track having common data for other volumetric media tracks belonging to a group.

The apparatus may further include wherein the signal information comprises a grouping structure, the grouping structure comprising a volumetric media unit header, wherein the volumetric media unit header comprises information about the atlas identifier and an indicator for a main track having common data for other volumetric media tracks belonging to a group.

The apparatus may further include wherein the signal information comprises a track group, the track group comprising a volumetric media unit header for the volumetric media track.

The apparatus may further include wherein the signal information provides at least one grouping type to specify a track grouping mechanism.

The apparatus may further include wherein the signal information comprises: a volumetric media sample entry comprising common data of volumetric media tracks originating from the volumetric media elementary stream; and a track reference in a volumetric media track reference table that references a volumetric media track, and is used to connect from the volumetric media track to the volumetric media parameters track.

The apparatus may further include wherein the signal information comprises: a volumetric media sample entry comprising common data of restricted volumetric media tracks of a certain type; a restricted sample entry comprising restricted scheme information; and a track reference in the volumetric media parameters track having a sample entry for connecting from the volumetric media parameters track to the restricted volumetric media tracks.

An example method includes providing signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

Other aspects of the method may include the following. The signal information may include: a volumetric media sample entry of volumetric media parameters track comprising common data of volumetric media tracks originating from the volumetric media elementary stream; and a track reference in a volumetric media parameters track reference table that references a volumetric media track, and is used to connect from the volumetric media parameters track to the volumetric media track. A volumetric media unit header atlas identifier may be mapped to an atlas identifier within a volumetric media sample structure for each of one or more network abstraction layer units. A volumetric media unit header atlas identifier may be mapped to an atlas identifier within a volumetric media sample structure for a group of network abstraction layer units.

An example apparatus includes means for providing signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

Other aspects of the apparatus may include the following. The signal information may include: a volumetric media sample entry of volumetric media parameters track comprising common data of volumetric media tracks originating from the volumetric media elementary stream; and a track reference in a volumetric media parameters track reference table that references a volumetric media track, and is used to connect from the volumetric media parameters track to the volumetric media track. A volumetric media unit header atlas identifier may be mapped to an atlas identifier within a volumetric media sample structure for each of one or more network abstraction layer units. A volumetric media unit header atlas identifier may be mapped to an atlas identifier within a volumetric media sample structure for a group of network abstraction layer units. A volumetric media unit header atlas identifier may be implicitly mapped to network abstraction layer units within a volumetric media sample structure. The volumetric media track may include a sub sample information box, and the sub sample information box may include a volumetric media unit header box in a codec specific parameters field that links sub sample network abstraction layer units in a volumetric media sample to a volumetric media unit header atlas identifier. The sample of the volumetric media track may include a sequence of volumetric media units having a payload and header, and the sample may correspond to a single point cloud frame, wherein samples corresponding to the single point cloud frame within one or more component tracks have a composition time corresponding to a composition time of the sample of the volumetric media track. The signal information may include: a grouping structure, the grouping structure comprising information about the atlas identifier; and an indicator to signal whether the volumetric media track is a main track having common data for other volumetric media tracks belonging to a group. The signal information may include a grouping structure, the grouping structure comprising the atlas identifier, wherein a track with a specific atlas identifier is implicitly considered as a main track having common data for other volumetric media tracks belonging to a group. The signal information may include a grouping structure, the grouping structure comprising a volumetric media unit header, wherein the volumetric media unit header comprises information about the atlas identifier and an indicator for a main track having common data for other volumetric media tracks belonging to a group. The signal information may include a track group, the track group comprising a volumetric media unit header for the volumetric media track. The signal information may provide at least one grouping type to specify a track grouping mechanism. The signal information may include: a volumetric media sample entry comprising common data of restricted volumetric media tracks of a certain type; a restricted sample entry comprising restricted scheme information; and a track reference in the volumetric media parameters track having a sample entry for connecting from the volumetric media parameters track to the restricted volumetric media tracks.

An example non-transitory program storage device readable by a machine, tangibly embodying a program of instructions executable by the machine for performing operations may be provided, the operations comprising: providing signal information to identify an atlas identifier on a sample of a volumetric media track, or on the volumetric media track in a multi-track container; wherein the signal information allows a file parser to link volumetric media tracks with different atlas identifiers that originate from a volumetric media elementary stream; and wherein the file parser is able to reconstruct the volumetric media elementary stream based on the signal information and data encapsulated in the multi-track container.

Other aspects of the non-transitory program storage device may include the following. The signal information may include: a volumetric media sample entry of volumetric media parameters track comprising common data of volumetric media tracks originating from the volumetric media elementary stream; and a track reference in a volumetric media parameters track reference table that references a volumetric media track, and is used to connect from the volumetric media parameters track to the volumetric media track. A volumetric media unit header atlas identifier may be mapped to an atlas identifier within a volumetric media sample structure for each of one or more network abstraction layer units.

An example apparatus includes means for providing signal information to identify an atlas identifier on a sample of a volumetric media track, or on the volumetric media track in a multi-track container; wherein the signal information configures a file parser to link volumetric media tracks with different atlas identifiers that originate from a volumetric media elementary stream; and wherein the file parser is configured to reconstruct the volumetric media elementary stream based on the signal information and data encapsulated in the multi-track container.

An example apparatus includes at least one processor; and at least one non-transitory memory including computer program code; wherein the at least one memory and the computer program code are configured to, with the at least one processor, cause the apparatus at least to perform: provide signal information to identify an atlas identifier on a sample of a volumetric media track, or on the volumetric media track in a multi-track container; wherein the signal information configures a file parser to link volumetric media tracks with different atlas identifiers that originate from a volumetric media elementary stream; and wherein the file parser is configured to reconstruct the volumetric media elementary stream based on the signal information and data encapsulated in the multi-track container.

An example method includes providing signal information to identify an atlas identifier on a sample of a volumetric media track, or on the volumetric media track in a multi-track container; wherein the signal information configures a file parser to link volumetric media tracks with different atlas identifiers that originate from a volumetric media elementary stream; and wherein the file parser is configured to reconstruct the volumetric media elementary stream based on the signal information and data encapsulated in the multi-track container.

An example non-transitory program storage device readable by a machine, tangibly embodying a program of instructions executable by the machine for performing operations, the operations comprising: providing signal information to identify an atlas identifier on a sample of a volumetric media track, or on the volumetric media track in a multi-track container; wherein the signal information configures a file parser to link volumetric media tracks with different atlas identifiers that originate from a volumetric media elementary stream; and wherein the file parser is configured to reconstruct the volumetric media elementary stream based on the signal information and data encapsulated in the multi-track container.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to:
   provide signal information to identify an atlas identifier on a sample of a volumetric media track, or on the volumetric media track in a multi-track container;
   wherein the signal information allows a file parser to link the volumetric media track associated with a first atlas identifier to another volumetric media track associated with a second atlas identifier, wherein the volumetric media track and the another volumetric media track originate from a volumetric media elementary stream; and
   wherein the file parser is configured to reconstruct the volumetric media elementary stream based on the signal information and data encapsulated in the multi-track container.

2. The apparatus of claim 1, wherein the signal information comprises:
   a volumetric media sample entry of a volumetric media parameters track comprising common data of volumetric media tracks originating from the volumetric media elementary stream;
   wherein the common data comprises parameter set data stored in a decoder configuration record, or immersive video camera parameters; and
   a track reference in a track reference table of the volumetric media track that references the volumetric media parameters track, and is used to connect the volumetric media track to the volumetric media parameters track.

3. The apparatus of claim 1, wherein a volumetric media unit header atlas identifier is mapped to an atlas identifier within a volumetric media sample structure for each of one or more network abstraction layer units.

4. The apparatus of claim 1, wherein a volumetric media unit header atlas identifier is mapped to an atlas identifier within a volumetric media sample structure for a group of network abstraction layer units.

5. The apparatus of claim 1, wherein a volumetric media unit header atlas identifier is implicitly mapped to network abstraction layer units within a volumetric media sample structure.

6. The apparatus of claim 1, wherein the volumetric media track comprises a sub sample information box, and wherein the sub sample information box comprises a volumetric media unit header box in a codec specific parameters field that links sub sample network abstraction layer units in a volumetric media sample to a volumetric media unit header atlas identifier.

7. The apparatus of claim 1, wherein the sample of the volumetric media track comprises a sequence of volumetric media units having a payload and header, and the sample corresponds to a single point cloud frame, wherein samples corresponding to the single point cloud frame within one or more component tracks have a composition time corresponding to a composition time of the sample of the volumetric media track.

8. The apparatus of claim 1, wherein the signal information comprises:
   a grouping structure, the grouping structure comprising information about the atlas identifier; and
   a binary indicator to signal whether the volumetric media track is a main track having common data for other volumetric media tracks belonging to a group.

9. The apparatus of claim 1, wherein the signal information comprises a grouping structure, the grouping structure comprising the atlas identifier, wherein a track with an atlas identifier having a specific value is implicitly considered as a main track having common data for other volumetric media tracks belonging to a group.

10. The apparatus of claim 1, wherein the signal information comprises a grouping structure, the grouping structure comprising a volumetric media unit header, wherein the volumetric media unit header comprises information about the atlas identifier and an indicator for a main track having common data for other volumetric media tracks belonging to a group.

11. The apparatus of claim 1, wherein the signal information comprises a track group, the track group comprising a volumetric media unit header for the volumetric media track.

12. The apparatus of claim 1, wherein the signal information provides at least one grouping type to specify a track grouping mechanism.

13. The apparatus of claim 1, wherein the signal information comprises:
 a volumetric media sample entry of the volumetric media track, the volumetric sample entry comprising common data of restricted volumetric media tracks of a certain type;
 a restricted sample entry of a restricted volumetric media track, the restricted sample entry comprising restricted scheme information; and
 a track reference in the volumetric media track having the volumetric media sample entry, the track reference configured to connect the volumetric media track to the restricted volumetric media track and to other restricted volumetric media tracks.

14. The apparatus of claim 1, wherein the signal information comprises a track group identifier that specifies a group or collection of tracks, the track group identifier having syntax inherited from a track group type box.

15. The apparatus of claim 1, wherein the volumetric media elementary stream comprises a V3C elementary stream.

16. The apparatus of claim 12, wherein the at least one type comprises at least one grouping box type, and wherein syntax of the at least one grouping box type extends a track group type box.

17. A method comprising:
 providing signal information to identify an atlas identifier on a sample of a volumetric media track, or on the volumetric media track in a multi-track container;
 wherein the signal information allows a file parser to link the volumetric media track associated with a first atlas identifier to another volumetric media track associated with a second atlas identifier, wherein the volumetric media track and the another volumetric media track originate from a volumetric media elementary stream; and
 wherein the file parser is configured to reconstruct the volumetric media elementary stream based on the signal information and data encapsulated in the multi-track container.

18. The method of claim 17, wherein the signal information comprises:
 a volumetric media sample entry of a volumetric media parameters track comprising common data of volumetric media tracks originating from the volumetric media elementary stream; and
 a track reference in a track reference table of the volumetric media track that references the volumetric media parameters track, and is used to connect the volumetric media track to the volumetric media parameters track;
 wherein the track reference in the track reference table comprises a type distinct from track reference types associated with occupancy, geometry, or attribute data.

19. A non-transitory program storage device readable by a machine, tangibly embodying a program of instructions executable by the machine for performing operations, the operations comprising:
 providing signal information to identify an atlas identifier on a sample of a volumetric media track, or on the volumetric media track in a multi-track container;
 wherein the signal information allows a file parser to link the volumetric media track associated with a first atlas identifier to another volumetric media track associated with a second atlas identifier, wherein the volumetric media track and the another volumetric media track originate from a volumetric media elementary stream; and
 wherein the file parser is configured to reconstruct the volumetric media elementary stream based on the signal information and data encapsulated in the multi-track container.

20. The non-transitory program storage device of claim 19, wherein the signal information comprises:
 a volumetric media sample entry of a volumetric media parameters track comprising common data of volumetric media tracks originating from the volumetric media elementary stream;
 wherein the common data comprises parameter set data stored in a decoder configuration record, or immersive video camera parameters; and
 a track reference in a track reference table of the volumetric media track that references the volumetric media track, and is used to connect the volumetric media track to the volumetric media parameters track.

* * * * *